Inventor
Weston A. Anderson
BY Wm. J. Nolan
ATTORNEY

Sept. 23, 1969 W. A. ANDERSON 3,469,180

APPARATUS FOR IMPROVING THE HOMOGENEITY OF A MAGNETIC FIELD

Original Filed Dec. 19, 1960 4 Sheets-Sheet 2

INVENTOR.
Weston A. Anderson
BY Wm. J. Nolan
ATTORNEY

Sept. 23, 1969 W. A. ANDERSON 3,469,180

APPARATUS FOR IMPROVING THE HOMOGENEITY OF A MAGNETIC FIELD

Original Filed Dec. 19, 1960 4 Sheets-Sheet 3

INVENTOR.
Weston A. Anderson
BY
W. J. Nolan
ATTORNEY

INVENTOR.
Weston A. Anderson
BY
Wm J. Nolan
ATTORNEY

United States Patent Office 3,469,180
Patented Sept. 23, 1969

3,469,180
APPARATUS FOR IMPROVING THE HOMOGENEITY OF A MAGNETIC FIELD

Weston A. Anderson, Palo Alto, Calif., assignor to Varian Associates, Palo Alto, Calif., a corporation of California Original application Dec. 19, 1960, Ser. No. 76,679, now Patent No. 3,199,021, dated Aug. 3, 1965. Divided and this application Mar. 22, 1965, Ser. No. 441,829
Int. Cl. G01n 27/00; G01r 33/08; H01f 27/28
U.S. Cl. 324—0.5 4 Claims

ABSTRACT OF THE DISCLOSURE

Shim coil apparatus for removing gradients in strong magnetic fields of the type required in gyromagnetic resonance spectrometers. One or more sets of circular coils are located in two planes which straddle the sample area, the geometry of the coils and their respective locations in the two planes being such that the ratio of the coil radii to their separation is a predetermined constant. The various coil configurations are capable of independently eliminating any, or all, of the first through the fourth order gradients which tend to destroy gyromagnetic spectra resolution obtainable from a sample spinning in the gap of a powerful magnet.

Figure 1:
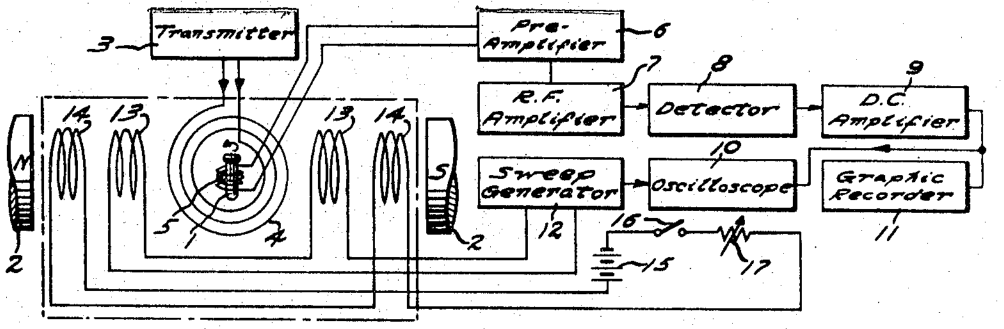

This application is a divisional application of my copending application, Ser. No. 76,679, filed Dec. 19, 1960, now U.S. Patent No. 3,199,021, for Improvements in Apparatus for Improving the Homogeneity of a Magnetic Field.

The present invention relates in general to method and apparatus for improving the homogeneity of magnetic fields and, more specifically, to novel shim coil configurations and combinations for removing substantially all of the first, second, third and fourth order gradients tending to destroy gyromagnetic spectra resolution obtainable from a sample spinning in the gap of a powerful magnet. The present invention is especially useful in the gyromagetic resonance art and is particularly useful for improving the homogeneity over a sample of matter in which extremely high resolution gyromagnetic resonance is being observed for the purpose of chemical analysis and process control.

Heretofore, various schemes have been utilized for removing magnetic field gradients in strong D.C. magnetic fields used in the gyromagnetic resonance art. Some of these devices have included, for example, means for forcibly distorting the yoke of the magnet assembly to produce slight changes in the parallelism of the magnet pole faces thereby serving to alter, in a compensating way, certain of the gradients in the magnetic field. Other devices have included spinners for spinning the gyromagnetic sample within the magnetic field to average out certain of the gradients which produce an undesired resonance line broadening. Recently, it has been found that electric shims or coils disposed at the proper place with respect to the sample and carrying the proper magnitude of electrical current can be utilized to remove certain undesired field gradients. With electric shims it is highly desirable that the individual coils or shims be arranged to remove substantially only one gradient in the magnetic field independently of other gradients such that varying or changing one gradient in the magnetic field does not simultaneously and concurrently therewith deleteriously affect other gradients of the magnetic field. When a first set of current shims operates substantially only upon one independent component of the magnetic field without effecting the independent field component established by a second set of electric shims, the first and second shims are said to be independent or orthogonal. Marcel J. E. Golay has suggested orthogonal shims mounted on the pole pieces of a nuclear spin resonance magnet. These shims consist of independent coil sheets with current distribution extending substantially over the entire surface of the pole pieces. Such current sheet shims are generally unsatisfactory because the thickness of a stack of current shims is equal to the thickness of an individual shim times the number of shims in a stack. This results in stacks of current shims on each pole piece which are excessively thick for many uses.

The present invention, by taking advantage of certain simplifications accruing from spinning the sample in a strong D.C. magnetic field, provides one independent coil set for removing all of the line broadening linear field components; one independent coil set for removing all of the line broadening quadratic field components, one independent coil set for removing all the third order line broadening field components and one independent coil set for removing all fourth order line broadening magnetic field components. Without taking advantage of the abovementioned simplifications, thirty-two independent coil sets would have been required for removing the independent line broadening field components through the fourth order. In addition, the present invention provides four additional coil sets for removing spinning sideband resonances. Two of these correspond to linear field components, and two are quadratic field components. In a typical high resolution gyromagnetic spectrometer apparatus, utilizing a spinning sample in a strong D.C. magnetic field, it has been found in most cases that the third and fourth order field components may be neglected as well as the second order field components which do not affect spinning resolution such that following the teachings of the present invention only four independent coil sets are required for removing all of the line broadening linear and quadratic field components plus all of the important spinning sidebands.

The object of the present invention is the provision of electric shimming method and apparatus for removing undesired gradients in magnetic fields such as, for example, those fields utilized for obtaining high resolution gyromagnetic resonance spectra.

One feature of the present invention is the provision of certain relatively simple coil geometries which can be combined to form an extremely thin stack of shims for independently removing certain undesired resonance line broadening linear, quadratic, third order and fourth order magnetic field components.

Another feature of the present invention is the provision of certain rectangular coil geometries for independently removing certain linear and line broadening magnetic field components.

Another feature of the present invention is the provision of certain curvilinear coil geometries for independently removing certain linear and quadratic line broadening magnetic field components.

Another feature of the present invention is the provision of certain rectilinear coil geometries for independently removing certain gyromagnetic resonance spinning sidebands producing magnetic field components.

Figure 2:
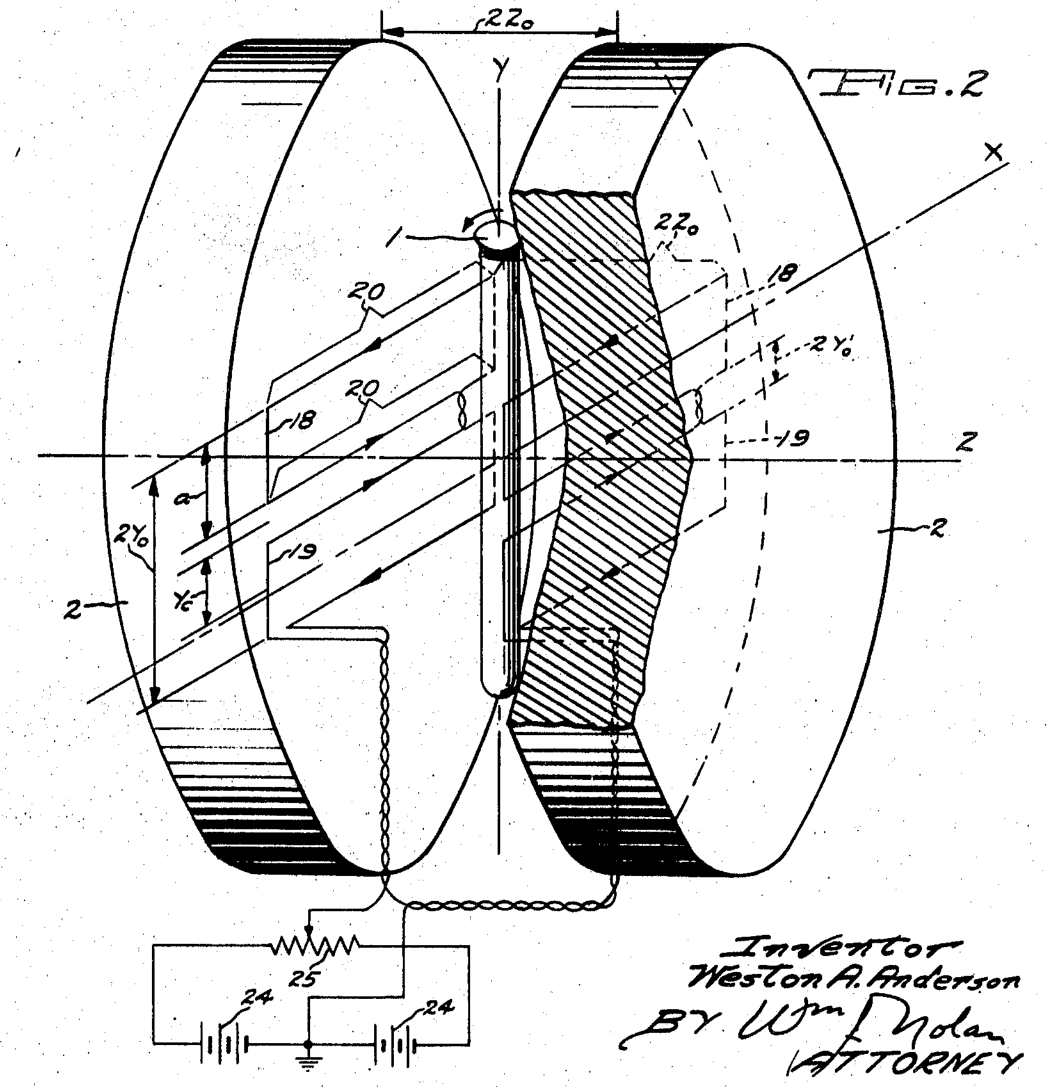
Figure 3:
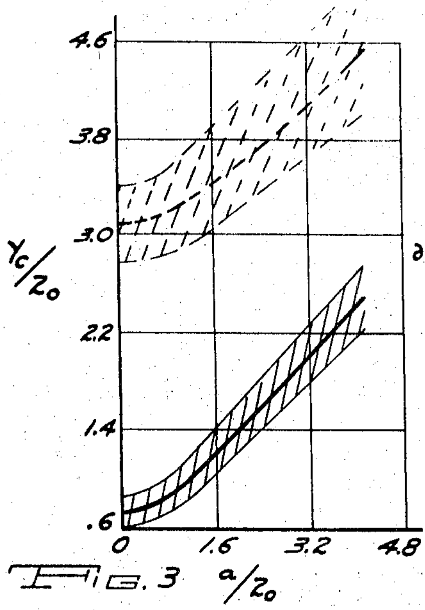
Figure 4:
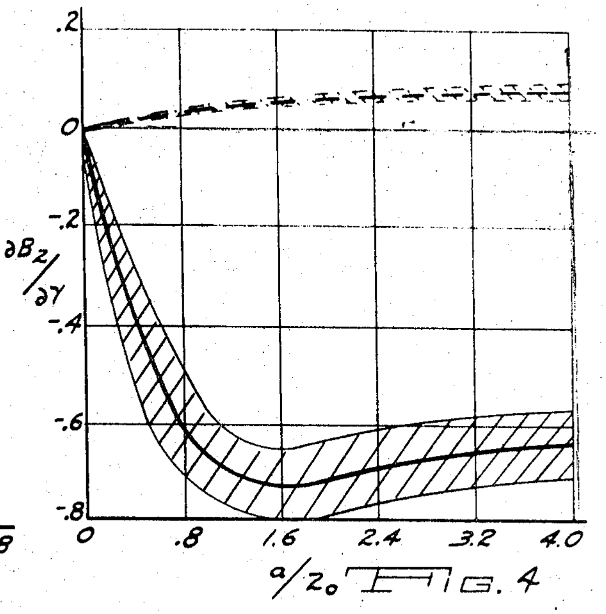
Figures 5, 7:
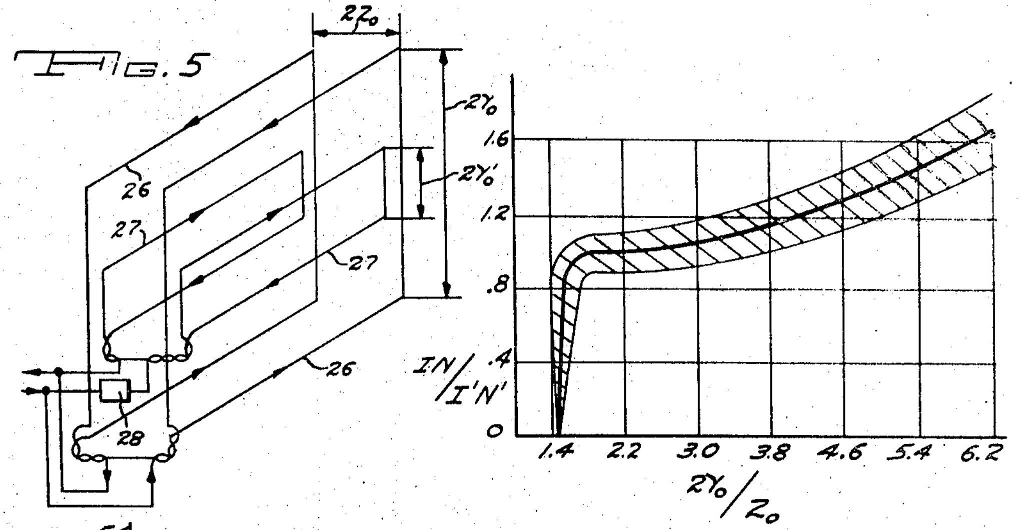
Figure 6:
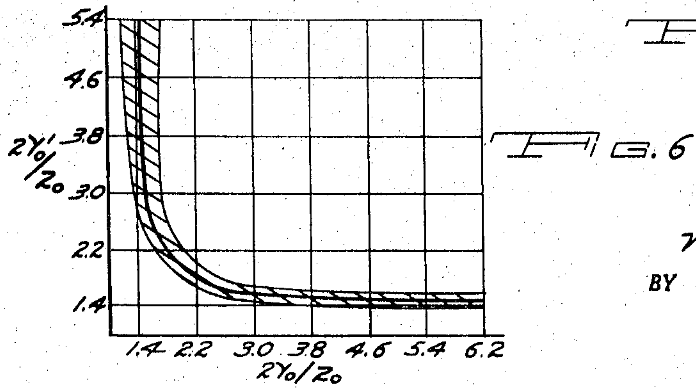
Figure 8:
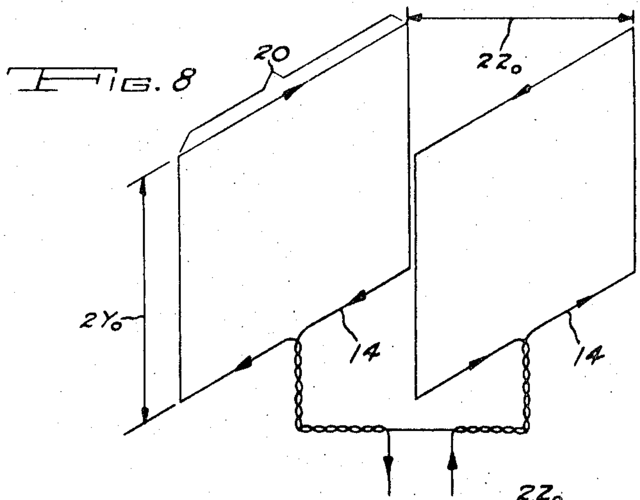
Figure 9:
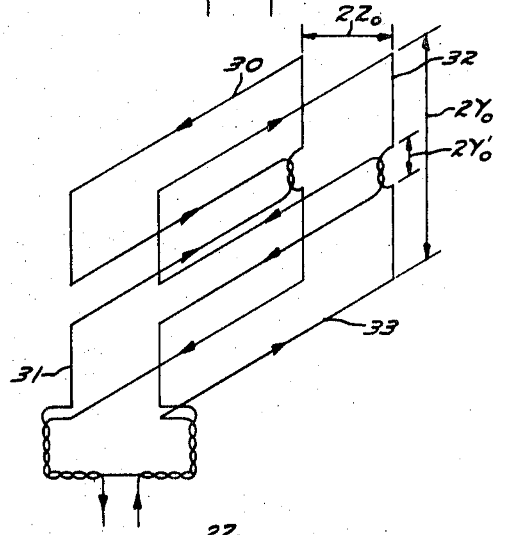
Figure 10:
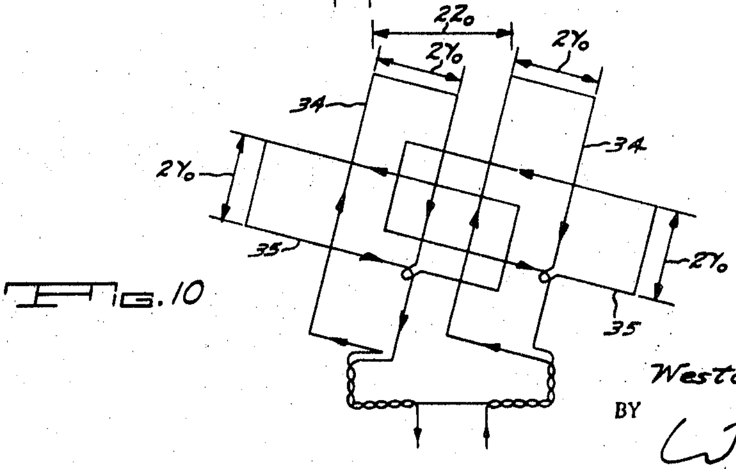
Figure 11:
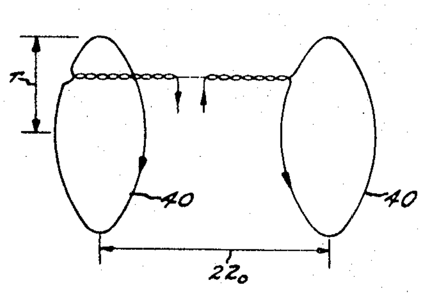
Figure 12:
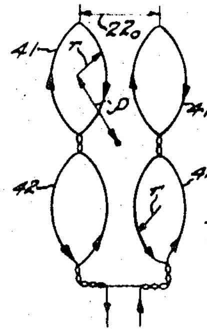
Figure 13:
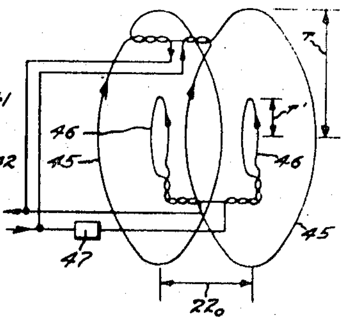
Figure 14:
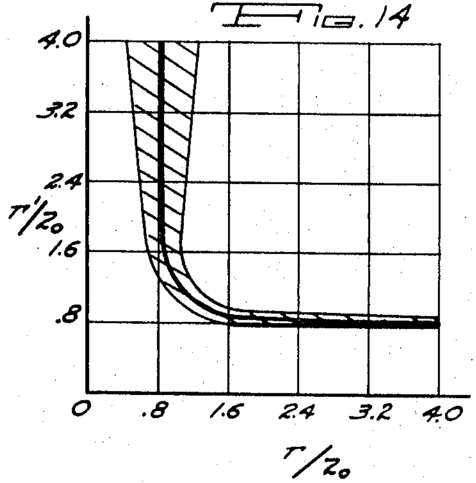
Figure 15:
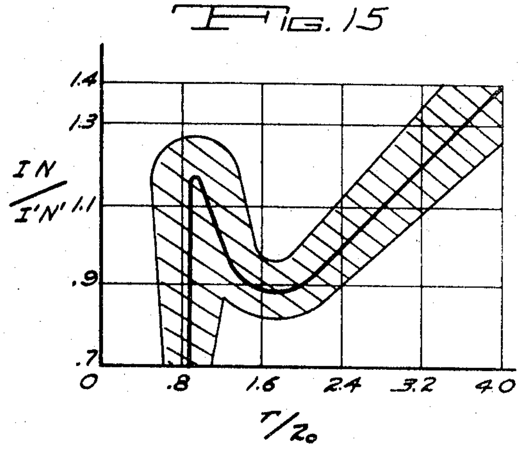
Figure 17:
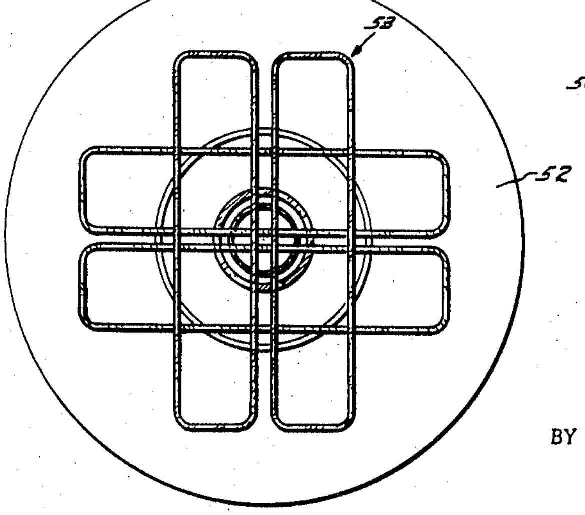
Figure 16:
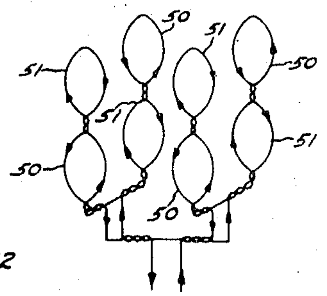

These and other features and advantages of the present invention will become apparent upon a perusal of the specification taken in connection with the accompanying drawings wherein:

FIG. 1 is a schematic block diagram for a gyromagnetic resonance spectrometer utilizing the features of the present invention, FIG. 2 is an isometric schematic diagram partially cut away showing the configuration and disposition of an independent set of rectilinear coils for independently removing undesired line broadening linear magnetic field components along the Y axis, FIG. 3 is a graphic solution for the proper relationships between certain parameters of the coil geometry shown in FIG. 2, FIG. 4 is a graphic solution for the proper relationship between certain other parameters of the coil geometry shown in FIG. 2, FIG. 5 is an isometric schematic diagram of the rectilinear coil geometry for removing the line broadening quadratic components of the magnetic field along the Y axis, FIG. 6 is a graphic solution of the parameters of the coil geometry shown in FIG. 5, FIG. 7 is a graphic solution of the ampere turn relationships for the coil configuration of FIG. 5, FIG. 8 shows the rectilinear coil configuration for independently removing certain linear line broadening components of the polarizing magnetic field, FIG. 9 depicts a rectilinear coil geometry for removing undesired line broadening magnetic field components, FIG. 10 shows the rectilinear coil configuration for independently removing certain other quadratic line broadening components of the polarizing magnetic field, FIG. 11 shows an isometric view of the curvilinear coil configuration for removing the linear line broadening components of the polarizing field in the direction of the polarizing field, FIG. 12 shows a schematic isometric view of the curvilinear coil configuration for removing the linear line broadening components of the polarizing magnetic field along the Y axis, FIG. 13 shows a schematic isometric view of the curvilinear coil configuration for removing certain quadratic line broadening components of the polarizing magnetic field, FIG. 14 shows the graphic solution of the parameters of the coil configuration of FIG. 13, FIG. 15 shows the graphic solution of the ampere turn relationships for the coil configuration of FIG. 13, FIG. 16 shows a schematic isometric view of the curvilinear coil configuration for removing certain quadratic line broadening components of the polarizing magnetic field, and FIG. 17 shows an arrangement of four different coil configurations for removing all linear line broadening components and certain quadratic line broadening components of the polarizing magnetic field.

Referring now to FIG. 1 there is shown in schematic block diagram form a typical high resolution nuclear resonance spectrometer useful for obtaining high resolution chemical spectra employed in chemical analysis and the like. More particularly, a substance which it is desired to analyze is placed in a suitable container such as, for example, a glass vial and immersed in a strong polarizing magnetic field such as that produced between the pole pieces of a powerful electromagnet 2.

An R.F. transmitter 3 supplies an alternating high frequency magnetic field to the sample, the time varying R.F. magnetic field being oriented approximately at right angles to the D.C. polarizing magnetic field produced by magnet 2. A receiver coil 5 is closely coupled to the sample of matter under analysis and is oriented approximately at right angles to the transmitter coil 4 and D.C. polarizing magnetic field such as to minimize the direct coupling between the R.F. transmitter 3 and the receiver coil 5 and to obtain maximum coupling to the precessing gyromagnetic bodies making up the sample of matter under analysis. The receiver coil 5 is coupled to a preamplifier 6 which in turn feeds an R.F. amplifier 7. The output of the R.F. amplifier 7 is detected in detector 8 and thence amplified in D.C. amplifier 9 and the output thereof is fed preferably to the vertical axis of oscilloscope 10 and/or to the vertical axis of a graphic recorder 11.

A sweep generator 12 supplies a sweep current to a pair of aiding connected sweep coils 13 disposed straddling the sample under analysis for sweeping the total polarizing magnetic field through resonance of the sample under analysis such that a gyromagnetic resonance spectrum of the sample may be obtained on the oscilloscope 10 and/or graphic recorder 11.

A pair of bucking connected electric shim coils 14 are disposed straddling the sample of matter under analysis and are supplied with current from a battery 15 via switch 16 and variable resistor 17.

In operation, while observing resolution of the gyromagnetic resonance spectrum on the oscilloscope or graphic recorder, switch 16 is closed and variable resistor 17 is adjusted for optimum resolution.

Although only one set of electric shim coils has been depicted in FIG. 1 in a practical application of electric shimming a plurality of independent electric shim coils will be utilized. Particular geometries and disposition of shim coils for preferred embodiments of the present invention will be shown and described below.

Electric shim coils 14 may be carried upon the gyromagnetic resonance probe, not shown, which normally houses the sample vial 1, transmitter coil 4, detector coil 5, and sweep coils 13 and is positioned in the gap of the magnet. However, in a preferred embodiment in the present invention, electric shim coils 14 are embedded in dielectrical thermally insulating pole cap covers fixedly secured to the mutually opposing pole faces of the electromagnet. By passing a separate controllable electric current through each of the electric shim coils 14, small local fields of corrective magnitude and direction may be set up in the magnet air gap to counteract remaining field gradients over the sample dimensions for obtaining optimum gyromagnetic resonance spectra resolution and/or removing spinning sidebands.

The particular electric shim coil geometries of this invention will be derived in detail below. However, briefly stated, this derivation calls for resolving the magnetic field into its possible components making a first simplified assumption that in the magnetic field region of interest there are no electric currents or ferromagnetic bodies, allowing one to expand the magnetic field as the gradient of a scalar potential. This results in a substantial reduction in the number of magnetic field components that must be considered and reduces these components to a certain number of independent components which can be seen in Table 1 below.

A second simplifying assumption is made that one of the D.C. components of the magnetic field is much, much greater than the other possible two over the sample volume and this reduces the number of magnetic field components which have to be considered.

A third simplifying assumption is made that the sample will be spun to average out magnetic field components that are not along the axis of spinning and this further simplifies the problem resulting in only having to consider those components of the field in the direction of the spinning axis of the sample.

Some additional components of the field are considered to remove magnetic field components that are usually averaged out by sample spinning. This allows removal of spinning sidebands and also improves spectra resolution where the sample cannot be easily spun. The result is that from a total number of magnetic field components of 363, through fourth order field components, the simplifying assumptions allows control of the field for most practical purposes by the use of six independent control knobs.

A detailed derivation of the particular electric shim coil configurations and dispositions will now be made. Since the polarizing magnetic field is a vector field it can be resolved into three D.C. components $B_x$, $B_y$, and $B_z$ a component along each direction in 3-dimensional space. Since it is possible for each of these three primary components to have linear gradients over the sample volume in the $x$ direction, $y$ direction and $z$ direction, this creates the possibility of a total of 9 linear gradients over the sample volume. Furthermore, since the linear or first order gradients can also have gradients in three directions over the sample volume this creates a total of 27 possible quadratic gradients. Furthermore, since each of the quadratic gradients can have a third order gradient in any one of the three directions. There can be a total of 81 third order gradients. Since each of the third order gradients can lead to a fourth order gradient along any one of the three directions over the sample volume this creates a total of 243 possible fourth order gradients. Thus, the total number of magnetic field components up to and including all possible fourth order gradients is 363. The total number of field derivatives is shown in column 2 of Table I below.

TABLE I

| Degree of legendre polynomial | Total No. of field derivatives | No. of orthogonal derivatives | No. of components of $B_z$ | No. of components not spun out | Type of component not spun out |
|---|---|---|---|---|---|
| 1 | 3 | 3 | 1 | 1 | $B_z$ |
| 2 | 9 | 5 | 3 | 1 | $\partial B_z/\partial Y$ |
| 3 | 27 | 7 | 5 | 1 | $\partial^2 B_z/\partial Y^2$ |
| 4 | 81 | 9 | 7 | 1 | $\partial^3 B_z/\partial Y^3$ |
| n | $3^n$ | 2n+1 | 2n−1 | 1 | $\partial^{n-1} B_z/\partial Y^{n-1}$ |

It is immediately apparent that the use of independent shim coils to remove each one of the possible gradients tabulated in column 2 of the table above would result in a prohibitive number of electric shim coils.

A number of simplifications will, therefore, be used in order to reduce the number of shim coils necessary.

An important requirement is that the shims be orthogonal so that controls will be independent of each other. This can be achieved by considering the constant terms in the spherical harmonic expansion of the magnetic field within the magnet gap.

Choosing the center of the sample as the origin of our coordinates and expanding by scalar potential $\Phi$ at a point P about this origin leads to the well-known spherical harmonics $$\Phi=\sum_{n=1}^{\infty}\sum_{m=0}^{n} r^n P_n^m (\cos\theta)[A_n^m \cos m\phi + B_n^m \sin m\phi] \quad (1)$$

where, referring to FIG. 2, $\Phi$ is the scalar potential at a point P, $P_n^m$ is the Legendre polynomial of order $m$ and degree $n$ $A_n^m$ and $B_n^m$ are constants; $r$ is the distance between the origin and point P, $\theta$ is the angle between $r$ and the $z$ axis and $\phi$ is the angle between the $x$ axis and the projection of $r$ on the $x$–$y$ plane.

Since the expansion will satisfy the La Place equation, $\nabla^2\Phi=0$, each of the constant terms thereof is uniquely determined for given field conditions. Therefore, expansiion (1) immediately yields the number of independent components in each order of a field derivative. A few examples will clarify this statement. With $n=1$, the expansion (1) represents the three components of the field; $-B_y=-A_2^0$; $B_z=-A_2^2$; $B_x=B_1^1$.

With $n=2$, the expansion (1) represents the linear field gradients. Although there are nine linear field gradients, only five of these are independent. Writing them in both spherical and rectangular coordinates they take the following forms:

$$(\Phi)_{n=2}=r^2\{A_2^0P_2^0+A_2^1P_2^1 \cos\phi+B_2^1P_2^1 \sin\phi+A_2^2P_2^2 \cos 2\phi+B_2^2P_2^2 \sin 2\phi\}$$
$$=\tfrac{1}{2}A_2^0(2Z^2-X^2-Y^2)+3A_2^1ZX+3B_2^1ZY+3A_2^2(X^2-Y^2)+6B_2^2XY \quad (2)$$

By designing shim coils which correspond to the various terms of such an expansion one may obtain a set of electric shims having controls which are substantially independent. The number of gradients to be considered is therefore reduced again as shown in column 3 of Table I.

The second simplifying assumption is that one of the

D.C. components of the magnetic field is much, much greater than the other possible two over the sample volume. Let the strong magnetic field $B_0$ be chosen in the Z direction of FIG. 2 and let the small variations in the field due to inhomogeneity be B′. The total field is thus:

$$\vec{B}=\vec{B}_0\vec{B}' \quad (3)$$

The variation in the resonance frequency of the sample being tested is determined by the variation in B over the sample:

$$/\vec{B}/=\sqrt{(B_0+B_z')^2+(B_x')^2(B_y')^2} \quad (4)$$

In practice, $B_0$ may be in the order of $10^4$ gauss while B′ has been found to be less than $10^{-1}$ gauss. Thus, we may expand with the result $$/\vec{B}/=B_0+B_z'+\frac{(B_x')^2+(B_y')^2}{2B_0} \quad (5)$$

Here we see that the X and Y components of B′ contribute only in the order of $16^{-6}$ gauss to the field variation and therefore they may be neglected. Thus, it is only necessary to consider the field components parallel to the Z-axis. Since $B_x$ and $B_y$ need not be considered and since $B_z$ also satisfies the La Place equation $\nabla^2B_z=0$, we may express $B_z$ directly in terms of the spherical harmonics $$B_z=\sum_{n=1}\sum_{m=0} r^nP_n^m (\cos\theta)[A_n^m \cos m\phi+B_n^m \sin m\phi] \quad (6)$$

Or, expressing $(B_z)$ in rectangular coordinates, one obtains $$B_z(x,y,z)=A_1^0+2A_2^0Z+3A_2^1X+3B_2^1Y+3A_3(2Z^2-X^2-Y^2)/2+12A_3^1ZX+12B_3^1ZY+15A_3^2(X^2-Y2)+15B_3^2(2XY)+A_4^0Z[8Z^2-15(X^2+Y^2)]/2+15A_4^1X(4Z^2-X^2-Y^2)/2+15B_4^1Y(4Z^2-X^2-Y^2)/2+90A_4^2Z(X^2-Y^2)+90B_4^2Z(2XY)+105A_4^3X(X^2-3Y^2)+105B_4^3Y(3X^2-Y^2)+ \quad (7)$$

where the $A_n^m$ and $B_n^m$ terms are constants with $n$ representing the degree of the Legendre polynomial and $m$ representing the order of the term.

It is seen from this expression that we have only one component of $B_z$ for the first degree of Legendre polynomial, three components of $B_z$ for the second degree of Legendre polynomial, five components of $B_z$ for the third degree of Legendre polynomial, etc. This result is tabulated in column 4 of Table I. Thus, from our original total of 363 field gradients in the first five degrees of Legendre polynomials, we now have only 25 components of $B_z$ which must be controlled in order to substantially eliminate field gradients in the vicinity of our sample.

Spinning the sample will result in a further reduction of necessary controls. The effect of sample spinning is to average out all magnetic field gradients except those in the axis of spin. Assuming spin about the Y axis, all the terms of Equation 7 which include forms of X and Z will be averaged out and therefore need not be considered further. The remaining terms of Equation 7 affect spinning resolution of the sample where spinning resolution is the resolution of the resonance lines in a gyromagnetic resonance spectrum obtained from a spinning sample. The $A_1^0$ term of these corresponds to the uniform field $B_z$ and can be disregarded. The remaining terms in Equation 7 which correspond to field gradients which must be considered further are $$3B_2^1Y,\ 3A_3^0(2Z^2-X^2-Y^2)/2$$

$$15A_3^2(X^2-Y^2),\ 15B_4^1Y(4Z^2-X^2-Y^2)/2,$$

and $$105B_4^3Y(3X^2-Y^2)$$

The results of sample spinning and the type of field gradients remaining are tabulated in columns 5 and 6 of Table I.

Deviatives corresponding to certain field gradients will now be derived. These deviatives will be used to design shim coils for controlling the field gradients which influence spinning resolution.

In FIG. 2, 20 represents a linear portion of coil 18 approximating for purposes of derivation an infinitely long wire in the X direction. The magnetic field produced by this wire at any point in the coordinate system is represented by the folowing expression:

$$B_z(x,y,z)=\frac{\mu_0 I_x(Y-Y_0)}{2\pi[(Y-Y_0)^2+(Z-Z_0)^2]} \tag{8}$$

where $\mu_0$ is the permeability of free space, $I_x$ is the current in the wire, $Y_0$ is the distance to the wire from the Z-axis in a $y$ direction, and $Z_0$ is the distance to the wire along the Z-axis. Although the use of an equation for the magnetic field about a finite wire will yield more exact results, the Equation 8 is of sufficient accuracy for the purposes of gyromagnetic resonance where diameters of the active portion of sample 1 are in the order of fractions of centimeters while the linear portion 20 of coil 18 is in the order of 15 more centimeters of length.

The magnetic field gradients at the origin, for a long straight wire, are readily calculated from Equation 8. With $R=Y_0/Z_0$, the field gradients evaluated at the point $x=y=z=0$ have the following form:

$$B_z=\frac{\mu_0 I_x}{2\pi Z_0}\,\frac{-R}{1+R^2} \tag{9}$$

$$\frac{\partial B_z}{\partial y}=\frac{\mu_0 I_x}{2\pi Z_0^2}\,\frac{1-R^2}{(1+R^2)^2} \tag{10}$$

$$\frac{\partial B_z}{\partial z}=\frac{\mu_0 I_x}{2\pi Z_0^2}\,\frac{-2R}{(1+R^2)^2} \tag{11}$$

$$\frac{\partial^2 B_z}{\partial y^2}=\frac{-\partial^2 B_z}{\partial z^2}=\frac{\mu_0 I_x}{2\pi Z_0^3}\,\frac{2R(3-R^2)}{(1+R^2)^3} \tag{12}$$

$$\frac{\partial^2 B_z}{\partial y\partial z}=\frac{\mu_0 I_x}{2\pi Z_0^3}=\frac{2(1-3R^2)}{(1+R^2)^3} \tag{13}$$

$$\frac{\partial^3 B_z}{\partial y^3}=\frac{-\partial^3 B_z}{\partial y\partial z^2}=\frac{\mu_0 I_x}{2\pi Z_0^4}\,\frac{-3!(1-6R^2+R^4)}{(1+R^2)^4} \tag{14}$$

$$\frac{\partial^3 B_z}{\partial z^3}=\frac{-\partial B_z}{\partial z\partial y^2}=\frac{\mu_0 I_x}{2\pi Z_0^4}\,\frac{-4!R(1-R^2)}{(1+R^2)^4} \tag{15}$$

$$\frac{\partial^4 B_z}{\partial y^4}=\frac{-\partial^4 B_z}{\partial y^2\partial z^2}=\frac{\partial^4 B_z}{\partial z^4}=\frac{\mu_0 I_x}{2\pi Z_0^5}\,\frac{-4!R(5-10R^2+R^4)}{(1+R^2)^5} \tag{16}$$

$$\frac{\partial^4 B_z}{\partial y^3\partial z}=\frac{-\partial^4 B_z}{\partial y\partial z^3}\,\frac{\mu_0 I_x}{2\pi Z_0^5}\,\frac{-4!(1-10R^2+5R^4)}{(1+R^2)^5} \tag{17}$$

$$\frac{\partial^5 B_z}{\partial y^5}=\frac{-\partial^5 B_z}{\partial y^3\partial z^2}=\frac{\partial^5 B_z}{\partial y\partial z^4}=\frac{\mu_0 I_x}{2\pi Z_0^6}\,\frac{5!(1-15R^2+15R^4-R^6)}{(1+R^2)^6} \tag{18}$$

$$\frac{\partial^5 B_z}{\partial z^5}=\frac{-\partial^5 B_z}{\partial z^3\partial y^2}=\frac{\partial^5 B_z}{\partial z\partial y^4}=\frac{\mu_0 I_x}{2\pi Z_0^6}\,\frac{6!R(1-10R^2/3+R^4)}{(1+R^2)^6} \tag{19}$$

The symbols $Y_0$, $Z_0$ and R will relate to the same parameters mentioned above whenever referred to in the derivations of each coil to follow.

Before considering specific current configurations it is useful to consider the effect of the symmetry of the current distribution upon the various field gradients. The magnetic field $\vec{B}$ produced by a current density $\vec{j}$ is given by the Biot and Savart law $$B=\frac{u_0}{4\pi}\iiint\frac{\vec{j}(r')x(\vec{r}-\vec{r}')dv'}{|r-r'^3} \tag{20}$$

Here $\vec{j}$ is the current per unit area,
$u_0$=permeability of free space
$\vec{r}$=coordinates of field point
$\vec{r}'$=coordinates of current source
$dv'$=increment of volume of current source.

The geometrics which are most applicable to most magnets are those in which the current distribution is confined to two parallel sheets at $Z'=\pm Z_0$, one against each magnet pole face 2 as shown in FIGURE 2. The volume integral may then be reduced to two surface integrals which have the form $$B_z(x,y,z)=\iint\frac{\{J_x(x',y',\pm z_0)[y-y']-J_y(z',y',\pm z_0)[x-x']\}dx'dy'}{[(x-x')^2+(y-y')^2+(z\pm z_0)]^{3/2}} \tag{21}$$

Here $J_x(x',y',\pm z_0)$, $J_y(x',y'\pm z_0)$ are the current densities per unit length on the surfaces at $z'=\pm z_0$. The total field and any of its derivatives may be calculated from (21). Let the point of measurement which corresponds to the center of the sample be at the position $x=y=Z=o$. Inspection of (21) shows that if $J_x$ and $J_y$ are identical at $\pm Z_0$ then at the origin the field $B_z$ and all derivatives with respect to either $x$ and $y$ are identical for the two current sheets with the result that the total gradients of this type are just twice that of a single current sheet. Gradients of the form $\partial^n B_Z/\partial_z n$ with $n$ an odd integer have opposite signs and thus the total gradient of this type vanish at the origin.

On the other hand if the conductor configuration on the two sheets are identical but the currents flow in opposite directions, then $B_z$ vanishes in the plane $z=0$ and thus all gradients of $B_z$ with respect to $x$ or $y$ also vanish in this plane as well as gradients of the type $\partial^n B_Z/\partial z^n$ with $n$ even.

Generally the conductor configuration will be symmetric upon reflection in the $x-z$ and $y-z$ planes. The current densities $J_x$ and $J_y$ will then differ at most in sign at the points $\pm x'\pm y'$. In addition the symmetry of one current component will determine that of the other component through the requirement that the divergence of the current density is zero.

If $J_y(x,y)=J_y(-x,y)$ then $J_x(x,y)=J_x(-x,y)$ and inspection of (21) shows that the field $B_z$ vanishes in the $y$ plane $x=o$ and thus all the derivatives of $B_z$ with respect to $y$ or $z$ must vanish as well as the even derivatives of $B_z$ with respect to $x$. If, however, $J_y(x,y)=-J_y(-x,y)$ then $J_x(-x,y)=J_x(-x,y)$ and all odd order gradients of $B_z$ with respect to $x$ will vanish.

Similarly if $J_x(x,y)=J_x(x,y)$, then $$J_y(x,y)=-J_y(x,-y)$$

$B_z$ will vanish in the $x$ plane $y=o$ and thus all derivatives of $B_z$ with respect to $x$ or $z$ vanish as well as the even derivatives of $B_z$ with respect to $y$. If $J_x(x,y)=-J_x(x-y)$, then $J_y(x,y)=J_y(x,-y)$ and all odd order gradients of $B_z$ with respect to $y$ will vanish.

It will be noted that FIG. 2 shows the current ribbons 20 as being closed within the volume between the pole faces to form rectangular coils. Such connections are merely a convenient manner of obtaining equal current flow and a compact structure. The symmetry considerations above require proper current flow in the longer coil sides of FIG. 2 but do not require any particular connection between these coil sides. This is also true of all the rectangular coils described hereafter.

Rectangular coil geometries are derived below for removing the field gradients which affect spinning resolution. In deriving these coils, Equations 9–19 which correspond to certain gradients will be utilized.

Only the currents in coil sides located in the upper half of the plane $Z=+Z_0$ as seen in FIG. 2 will be considered explicitly as the currents in coil sides located in the plane $Z=-Z_0$ and those in the lower half of plane $Z=+Z_0$ are located by the symmetry considerations discussed above. Use is also made of coordinate transformations that correspond to rotation about the Z axis.

FIG. 2 shows coil geometry which independently removes $\partial B_z/\partial_y$ gradient corresponding to term $B_2^1$ of Equation 7. A pair of rectangular coils 18 and 19 are collateral along their length in a first plane adjacent one of the pole pieces 2. A second pair of rectangular coils 18 and 19 are located opposite the first pair of coils in a second plane adjacent the other pole piece 2. Each of the coils 18 and 19 have the same dimensions including a width $a$ and the centers of coils 18 and 19 in each plane are a distance $(2Y_c)$ apart. The planes containing the rectangular coils 18 and 19 are parallel and separated by a distance $(2Z_o)$. The longer sides 20 of the rectangular coils 18 and 19 form linear current paths parallel to the plane $y=o$ and are spaced apart by a distance large compared to their cross section. The coils 18 and 19 are connected in series in a manner to provide the same direction of current flow in each of the coils 18 and a direction of current flow in each of the coils 19 opposite to that in coils 18. The parallel connected batteries 24 supply current through the variable resistance 25. Both of the coils 18 are above the plane $y=0$ in the coordinate system shown and both the coils 19 are below the plane $y=0$. Thus, with $J_x(x,y)=+J_x(x,-y)$, $B_z$ will vanish in the plane $y=0$. An examination of the coil symmetry discussed above will show that all of the gradients expressed in Equations 9 through 19, except 10, 14 and 18 will vanish because of symmetry. Equating the expression (14) to zero will yield a location for the coil sides which will cause the $\partial^3 B_z/\partial y^3$ term to vanish. Solving this gives the values $R=\pm(\sqrt{2}+1)$ and $R'=\pm(\sqrt{2}-1)$. Now, with the current directions shown in FIG. 2 and using the positive values for R and R' found above, the contributions to $\partial B_z/\partial y$ will add, giving this shim a resultant control of the $\partial B_z/\partial y$ gradient. Such a current configuration will result by separating the longer coil sides of the rectangular coils in FIG. 2 by a distance $a=2Z_0$ and centering them about the position $Y_c=\sqrt{2}Z_0$, where $2Z_0$ is the spacing between the coils on the pole faces and $Y_c$ is the shortest distance between the Z-axis and a point halfway between the coil sides derived above.

The solution above yielded a solution for the particular location for each current leg that would produce no gradients of the form $\partial^3 B_z/\partial y^3$; however, all that is desired is that the $\partial^3 B_z/\partial y^3$ gradient from the two legs cancel. Thus, for any coil of width $a$ one may calculate the value of coil center $Y_c$ which will cause the gradient $\partial^3 B_z/\partial y^3$ to vanish. The results of such a calculation have been plotted in FIG. 3, which shows $Y_c/Z_0$ vs. $a/Z_0$ for the gradient $$\frac{\partial^3 B_z}{\partial y^3}=0$$

It turns out that for each value of $a$ there are two values of $Y_c$, which cause the third order gradient to vanish. Of course, the value of the desired gradient $\partial B_z/\partial y$ will also depend upon the coil spacing $a$. This relationship is shown in FIG. 4 which is a graph showing the magnitudes of the desired gradient $\partial B_z/\partial y$ vs. $a/Z_0$ for the two possible values of $Y_c$. The dotted curve in FIG. 6 corresponds to the dotted curve in FIG. 5. It will be noted that the particular solutions for $a$ and $Y_c$ found above will lie on the curves plotted in FIGS. 3 and 4. The proper use of the curves shown in FIGS. 3 and 4 will give the dimensions for a coil shim which will independently control the $\partial B_z/\partial y$ gradient for a particular gap length. It is obvious from an examination of FIG. 4 that the value for $Y_c$ represented by the solid line is more desirable since it produces a greater $\partial B_z/\partial y$ gradient.

The positioning of the coils 18 and 19 relative to the pole pieces 2, the current supplies 24 and the axes shown in FIG. 2 is a typical arrangement. It will be assumed in discussion of the remaining shim coils that they are positioned in the same way. They will be shown alone, however, for purposes of simplicity and clarity.

The next two terms in Equation 7 which influence the spinning resolution of the sample are $A_3^0(2Z^2-X^2-Y^2)$ and $A_3^2(X^3-Y^2)$. Each of these terms correspond to a $\partial^2 B_z/\partial y^2$ gradient. A similar shim coil arrangement will result from a linear combination of these two terms yielding two new orthogonal terms which have the form $A'_3{}^0(z^2-y^2)$ and $A'_3{}^2(z^2-x^2)$. This linear combination has the added advantage that only the $A'_3{}^0(z^2-y^2)$ will now affect the spinning resolution because of a $\partial^2 B_z/\partial y^2$ gradient. It is therefore necessary to derive a shim in accordance with Equations 9 through 19 which will produce a gradient corresponding to this $A'_3{}^0$ term. To produce such a gradient with $$\frac{\partial^2 B_z}{\partial y^2}=\frac{\partial^2 B_z}{\partial z^2}\neq 0$$

the currents on the two pole faces shall be identical in magnitude and direction. Symmetry will then cause gradients of the type $\partial^n B_z/\partial z^n$ with $n$ odd to vanish in the plane $z=0$ and with $J_x(x,y)=-J_x(x,y)$ all $\partial^n B_z/\partial y^n$ terms with $n$ odd will vanish in the plane $y=0$. With these conditions, it is obvious that a single current filament cannot cause $B_z$ to vanish and produce the desired gradient. The field $B_z$ will vanish at the origin, however, if two filaments having currents of equal magnitude but opposite directions are located at R and R' where either $R=R'$ or $R'-1/R$. The second of these solutions yields $$\frac{\partial^2 B_z}{\partial y^2}=\frac{\mu_0 N I_x}{2\pi Z_0^3}\frac{6R(1-R^4)}{[1+(R)^2]^3}$$

The parameter R should now be chosen at an optimum value. However, with the conditions expressed above, there is no value of R which will cause the term $\partial^4 B_z/\partial y^4$ of Equation 16 to vanish while the desired $\partial^2 B_z/\partial y^2$ gradient of Equation 12 remains finite.

The fourth order term $\partial^4 B_z/\partial y^4$ may be made to vanish, however, if two current filaments having currents of unequal magnitude are used. A simple way to find such a solution is to find a value for R which will cause $\partial^4 B_z/\partial y^4$ to vanish. This is done by equating Equation 16 to zero, yielding the values $R^2=5+2\sqrt{5}$ and $(R')^2=5-2\sqrt{5}$.

FIG. 5 shows a coil arrangement for removing the $\partial^2 B_z/\partial y^2$ gradient corresponding to the linear combination $A'_3{}^0$ term obtained from Equation 7. One pair of concentric rectangular coils 26 and 27 are located in a first plane adjacent one pole piece. Another pair of concentric rectangular coils 26 and 27 are positioned opposite the first pair of rectangular coils 26 and 27 in a second plane adjacent the other pole piece. Each of the outer coils 26 of each pair have a width $(2Y_0)$ and each of the inner coils 27 of each pair have a width $(2Y'_0)$. The planes containing coils 26 and 27 are parallel and are separated by a distance $(2Z_0)$. The inner coils 27 are connected in series with a potentiometer 28 and this combination is connected in parallel with the series connected outer coils 26 in a manner to provide the same direction of current flow in each of the coils 26 and a direction of current flow in each of the coils 27 opposite to that in the coils 26. The current ratios in the two filaments are then adjusted by means of potentiometer 28 so that the field vanishes at the origin. This requires the proportion $$\frac{IN}{I'N'}=-1/2(1+\sqrt{5})=-1.617$$

where IN represents the ampere turns in the outer coils 26 and I'N' represents the ampere turns in the inner coils 27.

The above requirement that each current filament produce $\partial^4 B_z/\partial y^4$ gradient is not mandatory, however, and may be replaced by the less stringent demand that the total $\partial^4 B_z/\partial y^4$ gradient for both filaments vanish at the origin. Thus, for any value of R one can find a value of R' and a ratio of currents that will result in both $B_z$ and $\partial^4 B_z/\partial y^4$ vanishing. The graph of FIG. 6 plots values of $2R_1$ and 2R', which cause $B_z$ and $\partial^4 B_z/\partial y^4$ to vanish at the origin. Given a particular value for R, this graph can be used to find a proper value for R'. Similarly, the graph of FIG. 7 plots values of ampere turn ratios vs. 2R which cause $B_z$ and $\partial^4 B_z/\partial y^4$ to vanish at the origin. The proper ampere turn ratio for a particular value of R may be determined by using this graph.

The last two terms in Equation 7 which influence the spinning resolution of the sample are $$15B'_4Y(4Z^2-X^2-Y^2)/2$$

and $105B_4^3Y(3X^2-Y^2)$. Each of these terms correspond to a $\partial^3 B_z/\partial y^3$ gradient. A convenient linear combination of the $B_4^1$ and $B_4^3$ terms will yield a field of the type $B_z \sim y(y^2-3z^2)$. Such a field would be produced by identical current distributions at $\pm Z_0$; and with $$J_x(x,y)=-J_x(x,-y)$$

A single coil side at $R=1$ would produce the desired $\partial^3 B_z/\partial y^3$ gradient and no lower order terms. However, this would create the disadvantage that all currents flow in the same direction making it necessary to close the coil on the outside of the magnet.

A more convenient arrangement is achieved by locating two coil sides at positions R and R' which have currents of equal magnitude but flowing in opposite directions. The general configuration is the same as that for the $\partial B_z/\partial y$ gradient shown in FIG. 2 with the outer coil sides in each plane separated by a distance $(2Y_0)$ and the inner coil sides in each plane separated by a distance $(2Y'_0)$. The only gradients produced by this coil are the $\partial B_z/\partial y$ and the desired $\partial^3 B_z/\partial y^3$ gradients. The undesired term $\partial B_z/\partial y$ will then vanish if $Y_0$, $Y'_0$ and $Z_0$ are chosen so that $$(R')^2=\frac{R^2+3}{R^2-1}$$

and the desired gradient $\partial^3 B_z/\partial y^3$ will be a maximum with either R or R' as near to unity as possible. A shim for controlling the fourth order $\partial^4 B_z/\partial y^4$ gradient has the same general configuration as that for the $\partial^2 B_z/\partial y^2$ shown in FIG. 5. Again, identical current configurations at $$Z=\pm Z_0$$

are used and $J_x(x,y)=-J_x(x-y)$. The field $B_z$ and the second order gradients $$\frac{\partial^2 B_z}{\partial y^2}=-\frac{\partial^2 B_z}{\partial x^2}$$

are eliminated by using two currents of unequal magnitude flowing in opposite directions in the upper half of the planes $Z=\pm Z_0$. Solving Equations 8 and 10 when adapted to this situation yields the following relationship between positions and magnitudes of the current filaments:

$$(R')^2=\frac{3(2+R^2)}{R^2-3}$$

$$\frac{N'N'}{NI}=-\frac{R}{1+R^2}\,\frac{1+(R')^2}{R'}$$

With these four shims an independent control is obtained of all the terms in Equation 7 through five degrees of Legendre polynomial which will affect the spinning resolution of the sample. In practice, however, certain other terms in Equation 7 influence the homogeneity of the magnetic field without affecting the resolution of the spinning sample. This results from the introduction of spinning magnetic side bands which are brought about by the sample spinning. The spinning side band phenomena is discussed in an article by G. A. Williams and H. S. Gutowsky appearing in the Physical Review, 104, 278 (1956).

An interesting result in regard to these spinning side bands is found if Equation 7 is mathematically transformed by interchanging the Y and Z axes. Such a transformation yields a new expansion for $B_z$ in which each degree of the expansion has one zero order term which introduces gradients affecting the spinning resolution, two first order terms which introduce first side band resonances, two second order terms which introduce second side band resonances, etc. This relationship can be seen in the following table:

TABLE II

| Terms in equation (7) | Terms resulting from transformation of Y and Z axes |
|---|---|
| Second degree: | |
| $A_2^0 Z$ | $A'_2{}^0 Y$ |
| $A_2^1 X$ | $A'_2{}^1 X$ |
| $B_2^1 Y$ | $B'_2{}^1 Z$ |
| Third degree: | |
| $A_3^0 (2Z^2-X^2-Y^2)$ | $A'_3{}^0 (2Y^2-X^2-Z^2)$ |
| $A_3^1 (2XZ)$ | $A'_3{}^1 (2XY)$ |
| $B_3^1 (2YZ)$ | $B'_3{}^1 (2ZY)$ |
| $A_3^2 (X^2-Y^2)$ | $A'_3{}^2 (X^2-Z^2)$ |
| $B_3^2 (2XY)$ | $B'_3{}^2 (2XZ)$ |

In the transformed expansion above, the zero order terms $A'_2{}^0Y$ and $A'_3{}^0$ $(2Y^2-X^2-Z^2)$ affecting spinning resolution; the first order terms $A'_2{}^1X$, $B'_2{}^1Z$, $A'_3{}^1$ (2XY) and $B'_3{}^1$ (2ZY) introduce first side band resonances; the second order terms $A'_3{}^2$ $(X^2-Z^2)$ and $B'_3{}^2$ (2XZ) introduce second side band resonances, etc.

It has also been found that deriving shims for the control of at least the lower degree side band terms will substantially increase the homogeneity of the magnetic field. These shims are derived in the same general manner as those previously mentioned.

FIG. 8 shows a coil arrangement for removing a $\partial B_z/\partial_z$ gradient which corresponds to the $2A_2^0$ Z term in Equation 7. This gradient will introduce objectionable first side band resonances. A first rectangular coil 29 having a width $(2Y_0)$ is located in a first plane and a second rectangular coil 29 of width $(2Y_0)$ is positioned opposite the first coil in a second plane parallel to the first plane and separated therefrom by a distance $(2Z_0)$. The rectangular coils 29 are series connected in a manner to provide opposite directions of current flow in the two coils. The gradients produced by these coils at the location of the sample will be considered by reference to Equations 9 through 19. Because of symmetry about the Z-axis and the opposite direction of current flow in the two coils, all gradients of the type $\partial^n B_z/\partial y^n$ will vanish. Terms of the type $\partial^n B_z/\partial z^m$ with $m$ even will also vanish, leaving only resulting gradients represented by Equations 11, 15 and 19.

Equation 11 represents the $A_2^0$ Z term of Equation 7 which we desire to control. By equating (15) to zero and solving for R a location for the coils can be obtained which will eliminate the $\partial^3 B_z/\partial z^3$ gradient. The simple solution being $R=1$. The fifth order Equation 19 then represents the first undesirable gradient. A Taylors expansion can be used to evaluate this term so that its magnitude can be compared with that of the desired gradient $\partial B_z/\partial_z$. With $R=1$, this expression may be written:

$$B_z(x,y,z)=-\frac{u_0 I_z}{4\pi z_0}\left(\frac{z}{z_0}\right)\left\{1-4\left(\frac{x^2-10z^2Y^2+5Y^4}{z_0^4}\right)\right\}$$

This expression reveals that even with a relatively large sample having a $z/z_0 \sim 1/4$ when $z$ is the radius of the sample, the undesired gradient $\partial^3 B_z/\partial z^3$ is less than 2%. of the desired $\partial B_z \partial z$ gradient. It is therefore evident that the shim coils shown in FIG. 8 will give a substantially independent control of the $\partial B_z/\partial z$ gradient.

The $A_2^1$ X term of Equation 7 produces a $\partial B_z/\partial x$ gradient which also introduces first side band resonances. It is identical to the previously mentioned $\partial B_z/\partial y$ gradient except that it is rotated 90° about the Z-axis. Thus, the shim for this term is identical to that shown in FIG. 2 but it must be oriented at right angles thereto.

A shim to produce the $A'_3{}^2$ term formed by the linear combination of the $A_3^0$ and $A_3^2$ terms of Equation 7 is identical to that for the $A'_3{}^0$ term which is shown in FIG. 5 except that it is rotated by 90° about the Z-axis.

FIG. 9 shows a coil arrangement for removing a $\partial^2 B_z/\partial y \partial z$ gradient which corresponds to the $B_3^1$ term in Equation 7. A rectangular coil 30 and a rectangular coil 31 are collateral along their lengths in a first plane. Rectangular coils 32 and 33 are positioned opposite the rectangular coils 30 and 31 respectively in a second plane which is parallel to the first plane and separated therefrom by a distance $(2Z_0)$. The outer coil sides in both planes are separated by a distance $(2Y_0)$ and the inner coil sides in both planes are separated by a distance $(2Y'_0)$. All of the rectangular coils 30, 31, 32 and 33 are connected in series in a manner to provide the same direction of current flow in the coils 30 and 33 and a direction of current flow of the coils 31 and 32 opposite to that in coils 30 and 33. This arrangement will cause $\partial^n B_z/\partial z^n$ terms in Equations 9 through 19 for $n$ even and $B_z$ in the plane $z=0$ to vanish because of symmetry conditions. $B_z$ will also vanish in the plane $y=0$ with $J_x(x, y)=J_x(x, -y)$. Because of these symmetry conditions the first term after the desired $\partial^2 B_z/\partial y \partial z$ gradient to have a value will be the $\partial^4 B_z/\partial y \partial z^3$ term of Equation 17. The dimensions which will also cause this term to vanish are found by equating Equation 17 to zero. This results in the values $R^2=1\pm 2\sqrt{5}/5$. The coils 30, 31, 32 and 33 are thus dimensioned with $$\frac{Y_0}{Z_0}=1+2\sqrt{5}/5$$

and $$\frac{Y'_0}{Z_0}=1-2\sqrt{5}/5$$

FIG. 10 shows a coil arrangement for removing a $\partial^2 B_z/\partial x \partial y$ gradient which corresponds to the $B_3^2$ term of Equation 7. A rectangular coil 34 and a rectangular coil 35 are located in each of parallel planes adjacent each pole piece with the parallel planes being a distance $(2Z_0)$ apart. Each of the coils 34 and 35 have the same dimensions which include a length which is at least twice as large as its width $(2Y_0)$. The perpendicular coils 34 and 35 in each of the planes have the same center and are positioned opposite to the coils 34 and 35 respectively in the other plane. The coils are series connected in a manner to provide the same direction of current flow in each of the coils 34 and a direction of current flow in each of the coils 35 opposite to that in the coils 34.

The dimensions for the coils 34 and 35 are calculated by setting Equation 14 to zero yielding the values $R^2=\pm=2\sqrt{5}$. The value $R^2=5-2\sqrt{5}$ will yield the largest $\partial^2 B_z/\partial x \partial y$ gradient and is therefore more desirable.

The use of all the shim coils described above will give a substantially independent control of all the first, second, third and fourth order gradients which affect the magnetic resolution of a spinning sample and will eliminate certain low order gradients which produce side band resonances.

Although it is possible to derive shims for the control of higher order gradients, such derivations become increasingly more difficult. Furthermore, the use of the coils described above in various combinations has been found to produce magnetic field which are sufficiently homogeneous for most practical purposes.

Shims have also been designed which utilize circular current loops. The magnetic field due to the current flowing in a circular loop can be described in cylindrical coordinates using complete elliptic integrals. On p. 271 of International Series In Pure and Applied Physics by William A. Smythe, the axial field component of a loop located in the plane $z'=Z_0$ and centered at $x'$, $y'$ is given by:

$$B_z=\frac{\mu_0 I}{2\pi\sqrt{(r+\rho)^2+(z-Z_0)^2}}\left[+K+\frac{[r^2-\rho^2-(z-Z_0)^2]E}{(r-\rho)^2+(z-Z_0)^2}\right] \quad (20)$$

where $r$=radius of loop, $\rho=\sqrt{(x-x')^2+(y-y')^2}$ =radial distance from center of loop to point of field measurement;

K and E are complete elliptic integrals of the modula $$k^2=\frac{4r\rho}{(r+\rho)^2+(z-Z_0)^2}$$

The field on the axis of a circular loop is given by the simple expression $$B_z=\frac{\mu_0 I}{2r}\frac{r^3}{[r^2+(z-Z_0)^2]^{3/2}} \quad (21)$$

The derivatives from this expression may be calculated and evaluated at $z=0$. With the substitution $\alpha=r/Z_0$ these derivatives take the following form:

$$B_z=\frac{\mu_0 I}{2z_0}\frac{\alpha^2}{[1+\alpha^2]^{3/2}} \quad (22)$$

$$\frac{\partial B_z}{\partial_z}=\frac{\mu_0 I}{2z_0^2}\frac{3\alpha^2}{[1+\alpha^2]^{5/2}} \quad (23)$$

$$\frac{\partial^2 B_z}{\partial_z^2}=\frac{\mu_0 I}{2z_0^3}\frac{3\alpha^2(4-\alpha^2)}{[1+\alpha^2]^{7/2}} \quad (24)$$

$$\frac{\partial^3 B_z}{\partial z^3}=\frac{\mu_0 I}{2z_0^4}\frac{15\alpha^2(4-3\alpha^2)}{[1+\alpha^2]^{9/2}} \quad (25)$$

$$\frac{\partial^4 Bz}{\partial z^4}=\frac{\mu_0 I}{2z_0^5}\frac{45\alpha^2(8-12\alpha^2+\alpha^4)}{[1+\alpha^2]^{11/2}} \quad (26)$$

$$\frac{\partial^5 B_z}{\partial z^5}=\frac{\mu_0 I}{2z_0^6}\frac{45\alpha^2(56-140\alpha^2+35\alpha^4)}{[1+\alpha^2]^{13/2}} \quad (27)$$

Circular coil shims will now be derived for removing field gradients which correspond to certain terms in Equation 7. Equations 22–27 will be used in these derivations. The symbols $r$, $\rho$, and $\alpha$ will relate to the parameters described above wherever referred to in the derivation of the circular coils which follow.

FIG. 11 shows a circular coil for removing $\partial B_z/\partial z$ gradient of Equation 23. This gradient corresponds to the $A_2^0$ term of Equation 7. A circular coil 40 is adjacent each pole piece in parallel planes separated by a distance $2Z_0$. The coils 40 have their centers on the $z$-axis and have the same radius $r$. The coils 40 are connected in a manner to provide them with opposite directions of current flow. This arrangement will cause the gradents represented by Equations 22, 24, 25 and 26 to vanish because of symmetry if $$\frac{r}{Z_0}=\alpha=2/\sqrt{3}$$

leaving only Equation 27 to be considered. The expansion of the magnetic field from the coil in FIG. 11 is as follows:

$$B_z\simeq\frac{\mu_0 I}{2Z_0}\left[\frac{3\alpha^2}{(1+\alpha^2)^{5/2}}\left(\frac{z}{Z_0}\right)\right]\left[1+\frac{56-140\alpha^2+35\alpha^4}{8(1+\alpha^2)^4}\left(\frac{z}{Z_0}\right)^4\right] \quad (28)$$

Thus, for a $z/Z_0=\frac{1}{4}$ where $z$ is the radius of the sample and a $\alpha=2\sqrt{3}$ the field variation of the undesired $\partial^5B_z/\partial z^5$ gradient is only about 1% of the field variation of the desired $\partial B_z/\partial z$ gradient. Such a coil will therefore give substantially independent control of the $\partial B_z/\partial z$ gradient.

A coil configuration to produce the $\partial B_z/\partial x$ gradient which corresponds to the $A_2^1$ term of Equation 7 is the same as that shown for the $\partial B_z/\partial y$ gradient of FIG. 12 except that it must be rotated by 90° about the Z-axis.

FIG. 13 shows a circular coil shim for removing the quadratic gradients $$\frac{\partial^2 B_z}{\partial y^2}=\frac{-2\partial^2 B_z}{\partial z^2}=\frac{-2\partial^2 B_z}{\partial y^2}$$

which correspond to the $A_3^0$ term of Equation 7. A coil 45 of radius $r$ and a coil 46 of radius $r'$ are located in parallel planes separated by a distance ($2Z_0$) and each have each of their centers on the $z$-axis. The coils 45 and 46 are connected in parallel so as to provide for the same direction of current flow in each of the coils 45 and a direction of current flow in each of the coils 46 opposite to that in coils 45. Symmetry will then eliminate the gradients represented by each Equation 23 through 27 except the desired gradient of Equation 24 and the fourth order term $\partial^4B_z/\partial z^4$ of Equation 26. The dimensions can then be determined which will cause the fourth order gradient to vanish by setting Equation 26 equal to zero, yielding the values of $\alpha^2=6+2\sqrt{7}$ and $(\alpha')^2=6-2\sqrt{7}$. A suitable configuration is then obtained by dimensioning the coils 45 according to the positive value of ($\alpha^2$) above and the coils 46 according to the positive value of $(\alpha')^2$ above. The potentiometer 47 is connected in series with coils 46 and provides for adjustment of current in the inner coil to obtain the proper ampere turn ratio. These loops require a current ratio of $$\frac{NI}{N'I'}\cong 1.20$$

where NI represents the ampere turns in coils 45 and N'I' represents the ampere turns in coils 46.

The use of circular coils to produce the linear gradients $\partial B_z/\partial x$ and $\partial B_z/\partial y$ represented by the $A_2^1$ and $B_2^1$ terms of Equation 7 offers a more difficult problem since in these cases the field and its derivatives must be evaluated at a point removed from the Z-axis. In an article of the Journal of Applied Physics, 18, 976 (1947), John P. Blewett has taubulated $B_z$ as computed from Equation 20 for a number of values of $\rho/r$ and $(Z-Z')/r$. Using Blewett's tabulation for the ratio $$(Z-Z_0)/r=0.36,\ B_z \text{ vs. } \rho/r$$

has been plotted. A combination graphical method and the method of finite differences has been used to also plot the first three derivatives of $B_z$ with respect to $\rho/r$. These graphs indicate that for the values $\rho/r\cong 1.14$ and 0.83 the term $$\frac{\partial^3 B_z}{\partial z^3}=0$$

while the value of $\partial B_z/\partial y$ is still more than one-half of its maximum value. Thus, a shim to produce the $\partial B_z/\partial y$ gradient can be made in accordance with the arrangement shown in FIG. 12 which shows a coil 41 adjacent each pole piece and a coil 42 in each of a pair of parallel planes separated by a distance ($2Z_0$). Each of the coils 41 and 42 have a radius $r$ and are positioned so that each of their centers is a radial distance $\rho$ from a line perpendicular to the plane of the coils and passing through the center of the sample. Lines joining the centers of coils 41 and the centers of coils 42 on opposite pole pieces are perpendicular to the planes in which the pole pieces lie. The coils 41 and 42 are connected in series in a manner to provide the same direction of current flow in each of the coils 41 and a direction of current flow in each of the coils 42 opposite to that in the coils 41.

A more general solution may be determined if the restriction that each separate loop must cause no fourth order gradient is replaced by the condition that any fourth order gradient produced by one loop is cancelled by the other loop and that the total field $B_z$ vanish at the origin. Adding a second term representing a second current loop to Equations 22 and 26 and equating each to zero yields the desired solution. The results of this solution are shown graphically in FIGS. 14 and 15. In FIG. 14 the values of $r'/Z_0$ vs. $r/Z_0$ for $$\frac{\partial^4 B_z}{\partial z^4}=0$$

are plotted. The values of $r$ and $r'$ for a given $Z_0$ which will eliminate the $\partial^4B_z/\partial z^4$ gradient are determined from this curve. The values of $r$ and $r'$ which will maximize the desired gradient are equal or nearly equal to the values determined above, i.e., $\alpha^2=6+2\sqrt{7}$, $(\alpha')^2=6-2\sqrt{7}$. FIG. 15 plots the $NI/N'I'$ for a given $r/Z_0$ which will cause a cancellation of the $\partial^4B_z/\partial z^4$ gradient.

The next two gradients which affect spinning resolution of the sample will now be considered. The first of these is the $\partial^3B_z/\partial y^3$ gradient. A shim having coils in which $Z_0/r=0.36$ and values of $\rho/r=0.55$ and $\rho'/r=1.40$ will introduce the $\partial^3B_z/\partial y^3$ gradient and no linear gradient. The general current configuration is identical with the shim used to produce the $\partial B_z/\partial y$ gradient which is shown in FIG. 12.

Finally, the shim to produce a $$\frac{4\partial^4 B_z}{\partial y^4}=\frac{\partial^4 B_z}{\partial z^4}$$

gradient may be constructed with the same general configuration as that which produced the $\partial^2B_z/\partial z^2$ gradient. This coil arrangement is shown in FIG. 13. The proper dimensions for these coils can be determined by adding an additional term to Equations 22 and 24 to represent the second loop. These equations are then set equal to zero, yielding the relationship $$(\alpha')^2=\frac{4\alpha^2+9}{\alpha^2-4}$$

The current ratios may then be calculated from the relationship $$\frac{NI}{N'I'}=\frac{[1+\alpha^2]^{3/2}}{[1+(\alpha')^2]^{3/2}}\frac{(\alpha')^2}{\alpha^2}$$

FIG. 16 shows a circular coil arrangement for removing a $\partial^2B_z/\partial x\partial y$ gradient corresponding to the $B_3^2$ term of Equation 7. A pair of circular coils 50 and a pair of circular coils 51 are located in each of a pair of parallel planes adjacent the two pole pieces. The coils 50 in each parallel plane are positioned in the first and third quadrants of the $x$–$y$ plane and the coils 51 in each parallel plane are positioned in the second and fourth quadrants og the $x$–$y$ plane. The coils 50 and 51 are symmetrical about the center of the spinning sample and are connected in a manner to provide the same direction of current flow in each coil 50 and a direction of current in each coil 51 opposite to that in the coils 50. This coil arrangement will give substantially independent control of the $\partial^2B_z/\partial x\partial y$ gradient.

The rectangular and circular coils described above can be used in various combinations depending upon the type of field desired. Once a selection of coils has been made the coils may be mounted on a pair of compact shim structures for use immediately adjacent the pole pieces which produce the magnetic field. Such a structure is shown in FIG. 17, for example. This shim 52 is made up of the four sets of coils 53. The coils 53 are the same as those shown in FIGS. 2, 11 and 13. A proper selection of currents in two such shims 52 mounted on magnetic pole pieces in addition to spinning of the sample between the shims will substantially remove gradients from the volume of magnetic field between the shims which heretofore would have required eight separate orthogonal coil sets on each pole piece. It will be noted in the shim arrangement of FIG. 17 that there are never more than two thicknesses of coil at any particular location on the shim. This allows the stacking of four separate gradient removing coils within the width of two coils since the flexible coils can be set flush against the supporting shim except where they are actually in contact with one another. A pair of such shims may then be mounted within an extremely narrow magnetic gap.

In the preceding description several conductor patterns have been set forth which will independently remove particular undesired field gradients from a volume of magnetic fields. It is readily apparent that numerous other conductor patterns may be employed for removing other field gradients as taught herein.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for improving the homogeneity of a certain volume of magnetic field by removing a particular undesired field gradient including a first circular coil of radius $(r)$ lying in a first plane, a second circular coil of radius $(r)$ lying opposite said first circular coil in a second plane, said coils being series connected in a manner to provide, when energized, bucking magnetic fields due to the opposite directions of current flow in the respective coils, said first and second planes being substantially parallel and separated by a distance $(2Z_0)$, and said dimensions $(r)$ and $(Z_0)$ being of a magnitude such that $(r)/(Z_0)$ is approximately equal to $(2/\sqrt{3})$ to provide a coil arrangement which will substantially remove a particular gradient from said volume of magnetic field.

2. Apparatus for improving the homogeneity of a certain volume of magnetic field by removing a particular undesired field gradient including, a first pair of eccentric circular coils located in a first plane and having a radius $(r)$, a second pair of eccentric circular coils located opposite said first pair of coils in a second plane and having substantially the same radius $(r)$, said first and second planes being substantially parallel and spaced apart, said first and second pairs of coils being substantially symmetrically positioned about a point within said volume of magnetic field, the centers of said circular coils in each plane being separated by a distance $(\pi)$ from said point within said volume and said dimensions $(r)$ and $(\pi)$ being of magnitudes such that $\pi/r$ is substantially equal to 1.14 to provide a coil arrangement which will substantially remove a particular linear gradient from said volume of magnetic field.

3. Apparatus for improving the homogeneity of a certain vloume of magnetic field by removing a particular undesired field gradient including, a first pair of essentially concentric circular coils lying in a first plane, a second pair of essentially concentric coils lying opposite said first pair of coils in a second plane, said first and second planes being separated by a distance $(2Z_0)$, each of said first and second pairs of coils including a coil of radius $(r)$ and a coil of radius $(r')$, means for providing each of said coils of radius $(r)$ with ampere turns equal to $IN/I'N'$ times the ampere turns of said coils of radius $(r')$, where IN is equal to the ampere turns in said outer coil, I'N' is equal to the ampere turns in said inner coil and said parameters $(r)$, $(r')$ and $IN/I'N'$ being within the ranges cross-hatched in FIGS. 14 and 15 to provide a coil arrangement which will substantially remove a particular gradient from said volume of magnetic field.

4. Apparatus for improving the homogeneity of a certain volume of magnetic field by removing a particular undesired field gradient including a first set of four spaced apart eccentric circular flat coils located in a first plane, a second set of four spaced apart eccentric circular flat coils positioned opposite said first four circular coils in a second plane, each of said coils being comprised of a plurality of windings having substantially equal radii, said first and second planes being spaced apart and parallel to each other, and said first and second sets of circular coils being substantially symmetrical about the center of said certain volume of magnetic field to provide a coil arrangement which will substantially remove a particular gradient from said volume of magnetic field.

References Cited

UNITED STATES PATENTS

| | | | |
|---|---|---|---|
| 2,858,504 | 10/1958 | Nelson | 324—0.5 |
| 2,953,727 | 9/1960 | Gunthard | 324—0.5 |
| 3,199,021 | 8/1965 | Anderson | 324—0.5 |

FOREIGN PATENTS

| | | |
|---|---|---|
| 884,129 | 12/1961 | Great Britain. |
| 1,213,897 | 4/1960 | France. |

OTHER REFERENCES

Nuclear Instruments and Methods, No. 5, 1959—pp. 254–258—Vincent.

Physical Review—v. 102, No. 1—Apr. 1, 1956—pp. 136–150—Arnold.

RUDOLPH V. ROLINEC, Primary Examiner

MICHAEL J. LYNCH, Assistant Examiner

U.S. Cl. X.R.

317—123; 336—225, 232